United States Patent
Inoue et al.

(10) Patent No.: US 10,442,123 B2
(45) Date of Patent: Oct. 15, 2019

(54) INJECTION MOLDING MACHINE

(71) Applicant: TEKUNOHAMA CO., LTD., Toyota-shi, Aichi-ken (JP)

(72) Inventors: Tsuyoshi Inoue, Toyota (JP); Naoya Kametani, Anjo (JP); Akira Sakakibara, Toyota (JP)

(73) Assignee: TEKUNOHAMA CO., LTD., Toyota-Shi, Aichi-Ken (JP)

(*) Notice: Subject to any disclaimer, the term of this patent is extended or adjusted under 35 U.S.C. 154(b) by 0 days.

(21) Appl. No.: 16/144,420

(22) Filed: Sep. 27, 2018

(65) Prior Publication Data

US 2019/0152103 A1 May 23, 2019

(30) Foreign Application Priority Data

Nov. 22, 2017 (JP) ................. 2017-224623

(51) Int. Cl.
| | | |
|---|---|---|
| *B29C 45/17* | (2006.01) | |
| *B29C 45/07* | (2006.01) | |
| *B29C 45/13* | (2006.01) | |
| *B29C 45/64* | (2006.01) | |
| *B29K 105/00* | (2006.01) | |

(52) U.S. Cl.
CPC .......... *B29C 45/1761* (2013.01); *B29C 45/07* (2013.01); *B29C 45/13* (2013.01); *B29C 45/1777* (2013.01); *B29C 45/64* (2013.01); *B29C 45/1756* (2013.01); *B29C 2045/1767* (2013.01); *B29K 2105/0067* (2013.01)

(58) Field of Classification Search
CPC ..... B29C 45/04; B29C 45/0408; B29C 45/07; B29C 45/1756; B29C 45/1761; B29C 45/1777
See application file for complete search history.

(56) References Cited

U.S. PATENT DOCUMENTS

| | | | | |
|---|---|---|---|---|
| 5,916,604 | A * | 6/1999 | Oshiro ................. | B29C 45/07 264/328.11 |
| 10,315,346 | B2 * | 6/2019 | Sugahara ............ | B29C 45/1777 |
| 2005/0084556 | A1 * | 4/2005 | Yoshioka ............ | B29C 45/1777 425/149 |

FOREIGN PATENT DOCUMENTS

JP        2002205315 A        7/2002

* cited by examiner

*Primary Examiner* — James P Mackey
(74) *Attorney, Agent, or Firm* — Conley Rose, P.C.

(57) ABSTRACT

An injection molding machine for injecting a molten resin into a cavity of a molding die clamped in a die clamping unit via a nozzle formed in a heating cylinder to form a resin article includes a drive source. The drive source is configured to move the nozzle between a first position with the nozzle coupled to the molding die and a second position with the nozzle decoupled from the molding die. The drive source is also configured to pull out the molding die from the die clamping unit and to push the molding die into the die clamping unit.

10 Claims, 20 Drawing Sheets

INJECTION MOLDING MACHINE

CROSS-REFERENCE TO RELATED APPLICATIONS

This application claims the benefit of Japanese patent application Serial No. 2017-224623 filed Nov. 22, 2017, and entitled "Injection Molding Machine," which is hereby incorporated herein by reference in its entirety for all purposes.

STATEMENT REGARDING FEDERALLY SPONSORED RESEARCH OR DEVELOPMENT

Not applicable.

BACKGROUND

The present disclosure relates to an injection molding machine.

An injection molding machine is taught by, for example, Japanese Laid-Open Patent Publication No. 2002-205315 (JP2002-205315A). According to such an injection molding machine, a molten resin is injected into a molding cavity formed in a molding die composed of an upper or primary die part and a lower or secondary die part, so as to form a resin article. Generally, the injection molding machine is configured such that the molding die can be replaced with a replacement molding die in a die clamping unit. Therefore, the injection molding machine can be widely used in order to manufacture various types of resin articles without design changes.

However, as shown in FIG. 20, the injection molding machine 101 disclosed in Japanese Laid-Open Patent Publication No. 2002-205315 includes a first die replacement unit 104a and a second die replacement unit 104b to replace the molding die 106 with the replacement molding die 105. The first die replacement unit 104a may be used to introduce the replacement molding die 105 into the die clamping unit 102. Conversely, the second die replacement unit 104b may be used to eject the molding die 106 from the die clamping unit 102. Therefore, the injection molding machine 101 requires substantial space on both sides of the die clamping unit 102 to accommodate the first and second die replacement units 104a and 104b therein. As a result, the injection molding machine 101 may have an increased width W2. Further, the first die replacement unit 104a relies on a drive source (not shown) to force the replacement molding die 105 into the die clamping unit 102, and similarly, the second die replacement unit 104b relies on a drive source (not shown) to withdraw the molding die 106 from the die clamping unit 102. That is, the injection molding machine 101 uses two independent drive sources to operate the first and second die replacement units 104a and 104b.

Thus, there is a need in the art for an improved injection molding machine.

SUMMARY

In one embodiment of the present disclosure, an injection molding machine is configured to inject a molten resin into a cavity of a molding die clamped in a die clamping unit via a nozzle formed in a heating cylinder so as to form a resin article. The injection molding machine includes a drive source that functions to move the nozzle so as to couple the nozzle to the molding die or to decouple the nozzle therefrom. In addition, the drive source is used as a drive source to pull out the molding die from the die clamping unit or to push the molding die into the die clamping unit.

According to the present disclosure, the injection molding machine needs no special drive source to pull out the molding die from the die clamping unit or to push the molding die into the die clamping unit.

Further, according to the present disclosure, a single die replacement unit may be used to replace the molding die with another molding die. The die replacement unit may be positioned adjacent to the die clamping unit in a longitudinal direction of the injection molding machine. Therefore, the injection molding machine may have a reduced in width.

Other objects, features and advantages of the present disclosure will be readily understood after reading the following detailed description together with the accompanying drawings and the claims.

DETAILED DESCRIPTION

A detailed representative embodiment of the present disclosure will be described with reference to FIGS. 1 to 19.

Figure 1:
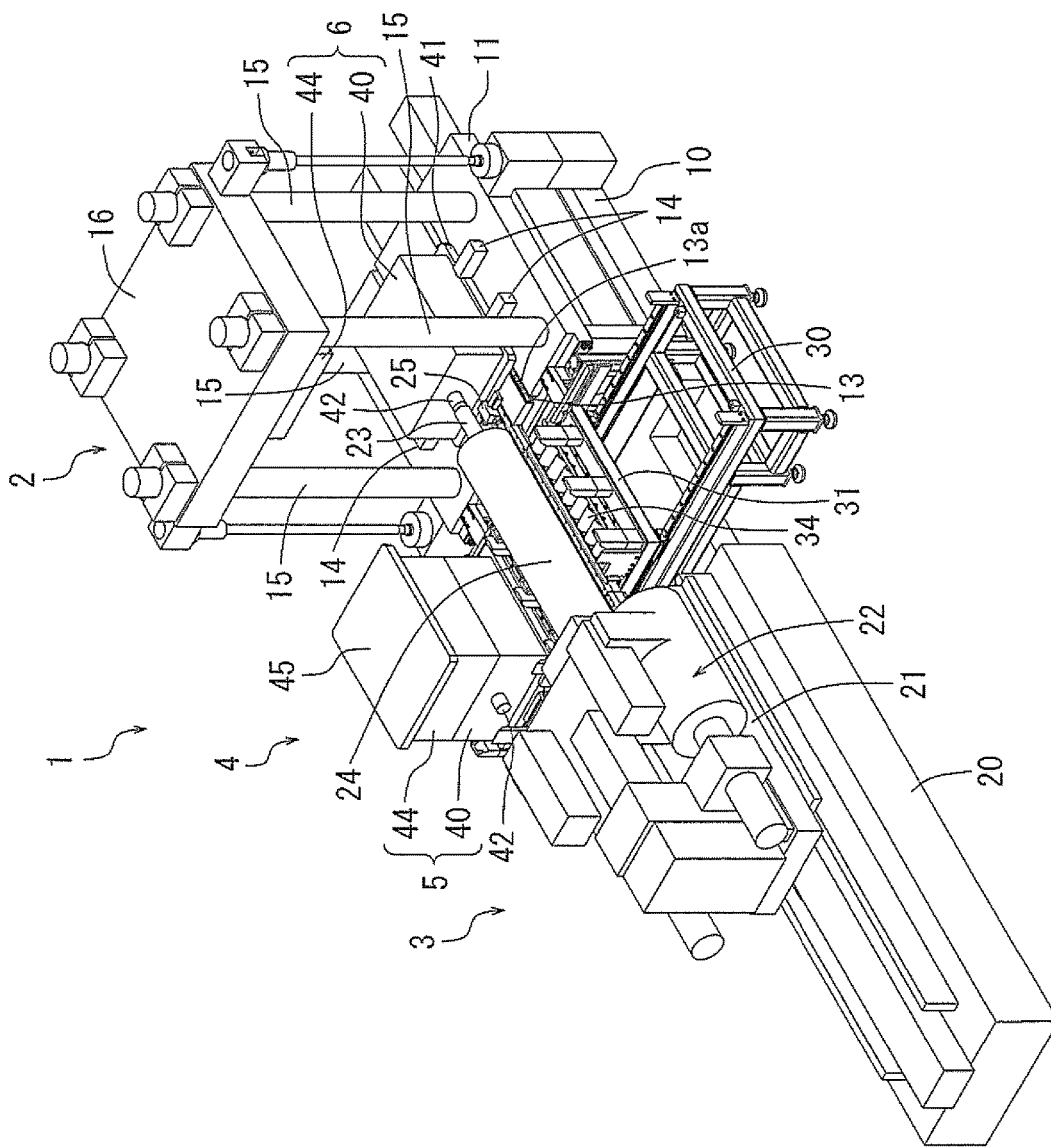
FIG. 1 is a perspective view of an injection molding machine according to a representative embodiment of the present disclosure, in which a second molding die is received in a die clamping unit.

As shown in FIG. 1, an injection molding machine 1 according to a representative embodiment of the present disclosure includes a die clamping unit 2, an injection unit 3, and a die replacement unit 4. The die clamping unit 2, the injection unit 3, and the die replacement unit 4 may be longitudinally arranged (in line) with the die replacement unit 4 positioned between the die clamping unit 2 and the injection unit 3. The die clamping unit 2 is configured such that a first (replacement) molding die 5 and a second molding die 6 can be set therein. Further, the first molding die 5 may have a lower die half 40 and an upper die half 44 that may be vertically aligned. The lower die half 40 and the upper die half 44 may have a lower molding recess (not shown) and an upper molding recess (not shown), respectively, so as to define a molding cavity (not shown) therebetween when the first molding die 5 is closed. Similarly, the second molding die 6 may have a lower die half 40 and an upper die half 44 that may be vertically aligned. The lower die half 40 and the upper die half 44 may have a lower molding recess (not shown) and an upper molding recess (not shown), respectively, so as to define a molding cavity (not shown) therebetween when the first molding die 5 is closed. As will be recognized, the first molding die 5 and the second molding die 6 may be the same as each other except that the molding cavities thereof are different in shape from each other.

As shown in FIGS. 1 to 4, the die clamping unit 2 includes a lower base 10 and an upper base (not shown) that are positioned vertically opposite to each other. The lower base 10 and the upper base may be connected to each other via four columns (not shown). Further, the die clamping unit 2 includes a lower die attachment plate 11 to which the lower die half 40 is attached and an upper die attachment plate 16 to which the upper die half 44 is attached. The lower die attachment plate 11 is connected to the lower base 10. The upper die attachment plate 16 is positioned vertically above and opposite the lower die attachment plate 11. The upper die attachment plate 16 may be vertically moveable relative to the lower die attachment plate 11 via four upright guide rods 15, so as to move vertically toward and away from the lower die attachment plate 11. To move the upper die attachment plate 16 vertically relative to the lower die attachment plate 11, a drive source (not shown) may be attached to the upper base. As will be recognized, due to vertical movement of the upper die attachment plate 16, the first molding die 5 (or the second molding die 6) set in the die clamping unit 2 may be closed (clamped) or opened.

Figure 3:
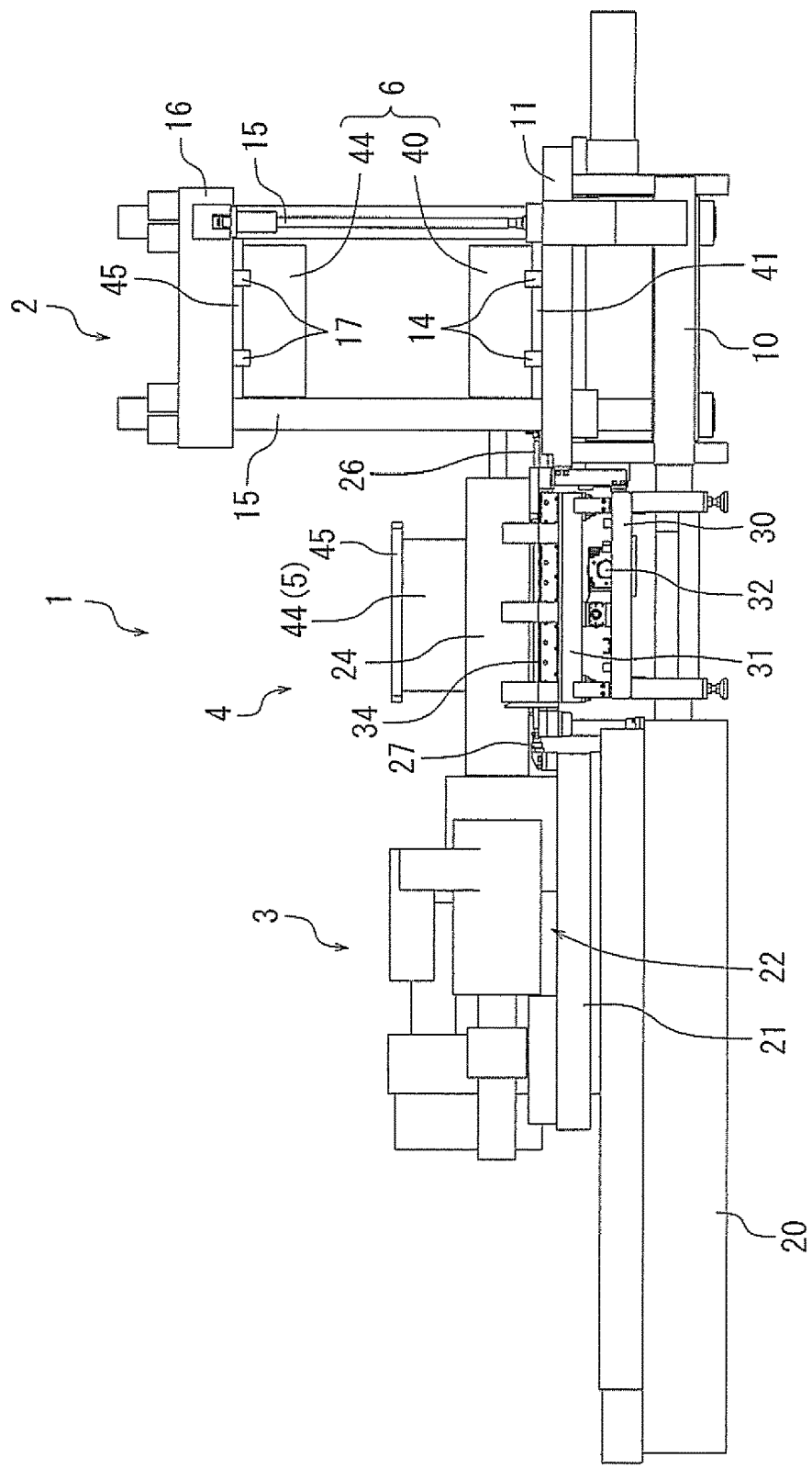
FIG. 3 is a side view of the injection molding machine shown in FIG. 1.
Figure 5:
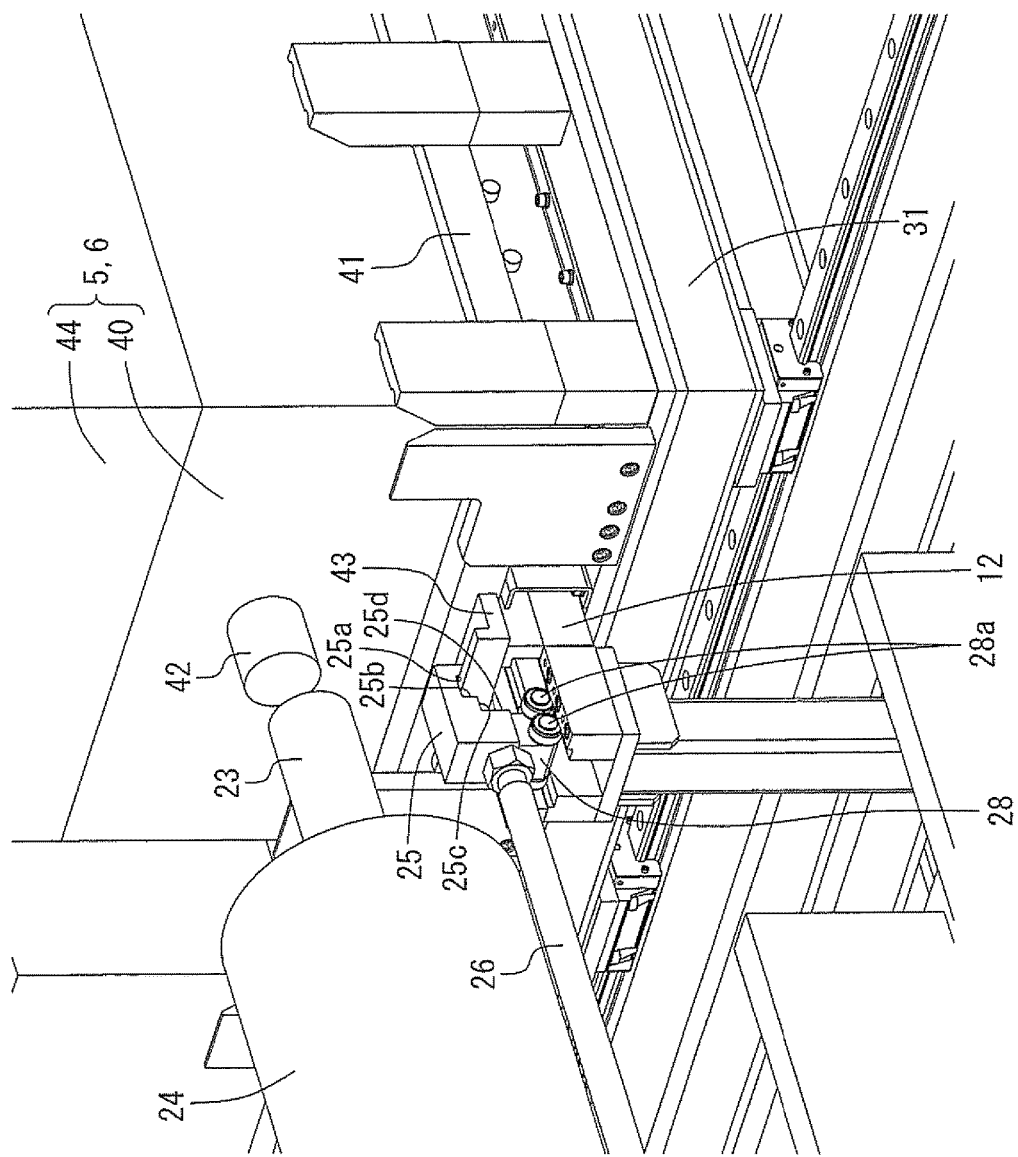
FIG. 5 is an enlarged perspective view of the injection molding machine shown in FIG. 1, which illustrates a condition in which the first (second) molding die is still situated in a die replacement unit and is not introduced into the die clamping unit.

As shown in FIG. 5, the die clamping unit 2 includes a guide member 12 attached to the lower die attachment plate 11 and having a substantially U-shaped cross-section. The guide member 12 may extend or be directed toward the injection unit 3. Further, as shown in FIG. 1, the die clamping unit 2 has a pair of (right and left) die lifters 13 that are attached to the lower die attachment plate 11. The die lifters 13 are configured to raise and lower the lower die half 40 of the first molding die 5 (or the second molding die 6). The die lifters 13 may respectively have rollers 13a that function to smoothly move or slide the lower die half 40 of the first molding die 5 (or the second molding die 6) thereon, so as to allow the first molding die 5 (or the second molding die 6) to be easily introduced into and ejected from the die clamping unit 2. Further, as shown in FIG. 3, the lower die attachment plate 11 may have two pairs of (right and left) clamps 14 in order to secure the lower die half 40 of the first molding die 5 (or the second molding die 6) thereto. Similarly, the upper die attachment plate 16 may have two pairs of (right and left) clamps 17 in order to secure the upper die half 44 of the first molding die 5 (or the second molding die 6) thereto.

As shown in FIG. 1, the injection unit 3 includes a longitudinally elongated base or platform 20, a slider 21, and a heating cylinder 24. The slider 21 is longitudinally slidably attached to the platform 20. That is, the slider 21 may slide back and forth along the platform 20 so as to move toward and away from the die clamping unit 2. The heating cylinder 24 is connected to the slider 21 so as to extend toward the die clamping unit 2. Thus, the heating cylinder 24 may be moved toward and away from the die clamping unit 2 when the slider 21 is moved. Further, the slider 21 is moved or slid by a drive source 22 attached thereto.

Figure 4:
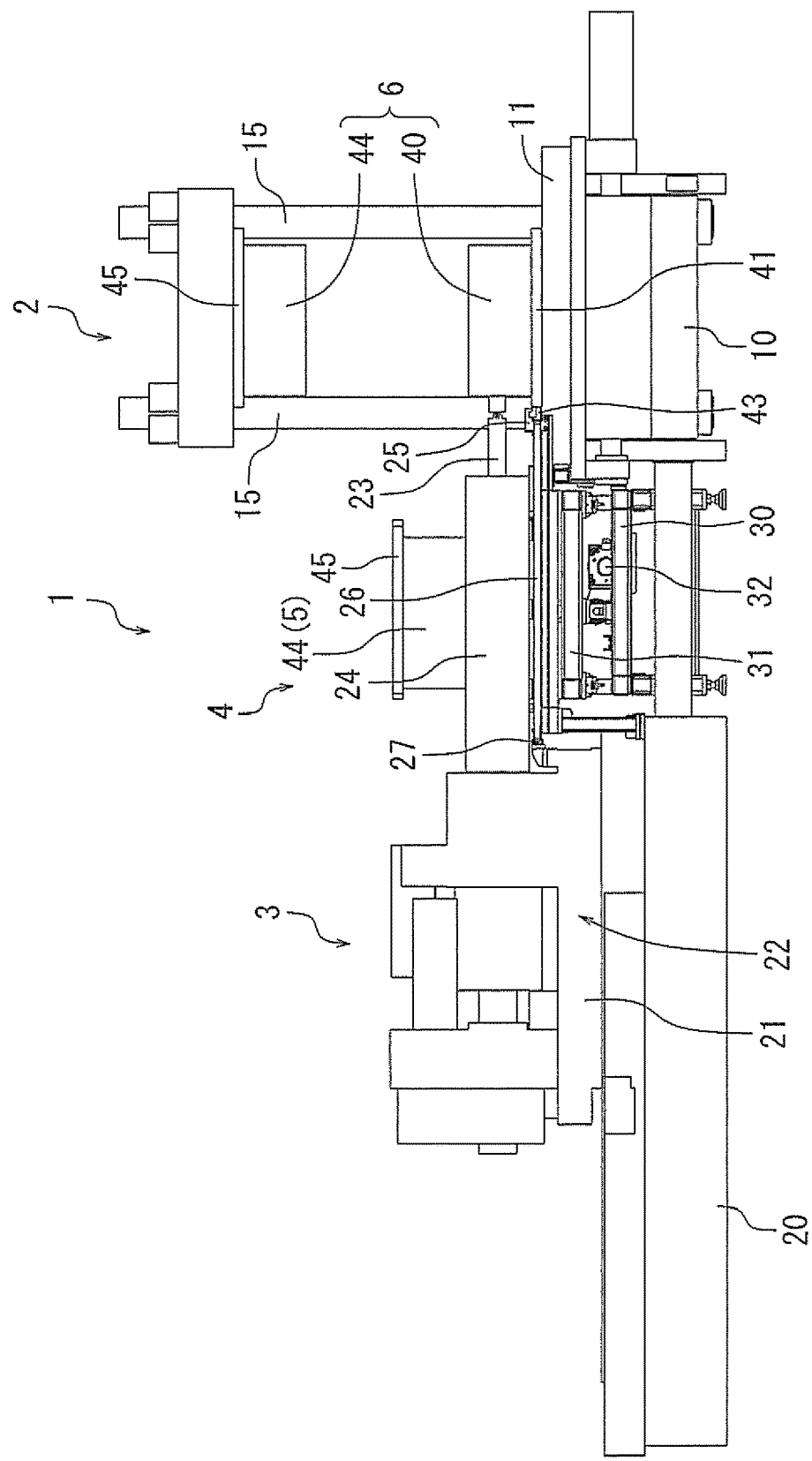
FIG. 4 is a partially removed side view of the injection molding machine shown in FIG. 1.

As shown in FIG. 1, the heating cylinder 24 includes a nozzle 23 that injects a molten resin (not shown) into the molding cavity of the first molding die 5 (or the second molding die 6). Further, as shown in FIGS. 3 and 4, the slider 21 includes an elongated engagement rod (member) 26. In this embodiment, the engagement rod 26 is attached to the slider 21 via a floating joint 27 at its proximal end, so as to extend toward the die clamping unit 2. Therefore, the engagement rod 26 may longitudinally slide with the slider 21. As best shown in FIG. 5, the engagement rod 26 has a hook 25 attached to a distal end thereof. The engagement rod 26 and the hook 25 are preferably made of metal.

The hook 25 releasably engages the first molding die 5 (or the second molding die 6) to longitudinally move the first molding die 5 (or the second molding die 6) when the slider 21 is moved. In particular, as shown in, for example, FIG. 7, the hook 25 of the engagement rod 26 has a backward faced inner pulling surface 25a, a forward faced inner pushing surface 25b positioned longitudinally opposite to the pulling surface 25a, and a forward faced inner relief surface 25d that is continuous with the pushing surface 25b via a shouldered surface 25c. Further, as shown in FIG. 5, the hook 25 includes a guide block (element) 28 having rollers 28a. The guide block 28 is slidably received in the guide member 12 attached to the lower die attachment plate 11 of the die clamping unit 2.

Figure 2:
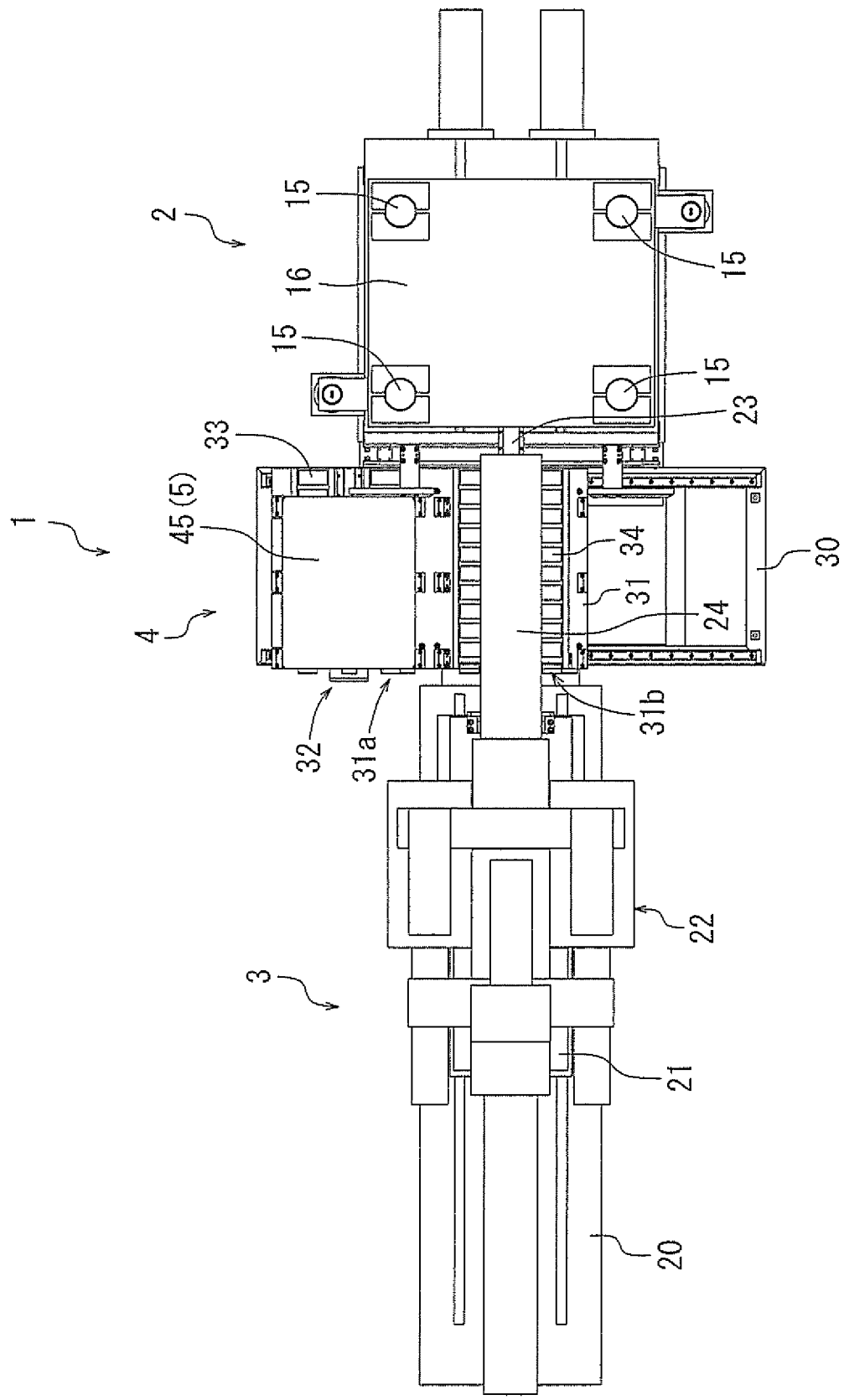
FIG. 2 is a plan view of the injection molding machine shown in FIG. 1.

As shown in FIGS. 1 to 4, the die replacement unit 4 includes a laterally elongated base 30 and a table 31. The table 31 has a left (first) die receiving portion 31a and a right (second) die receiving portion 31b on which two molding dies (the first molding die 5 and the second molding die 6) are respectively be disposed. The table 31 can slide in a lateral or width direction of the injection molding machine 1 generally perpendicular to the longitudinal direction. In particular, the table 31 is slidably disposed on the base 30 so as to slide laterally (right and left) between a left-side position and a right-side position. That is, the die receiving portions 31a and 31b of the table 31 can move in the width direction. The table 31 is moved or slid by a drive source 32 attached to the base 30. As shown in FIG. 2, the table 31 also includes a plurality of first rollers 33 and a plurality of second rollers 34 that are arranged in two rows. The first rollers 33 and the second rollers 34 are positioned on the left die receiving portion 31a and the right die receiving portion 31b, respectively, of the table 31. The first and second rollers 33 and 34 are arranged such that the first molding die 5 and the second molding die 6 may smoothly move or slide longitudinally on the table 31.

Figure 6:
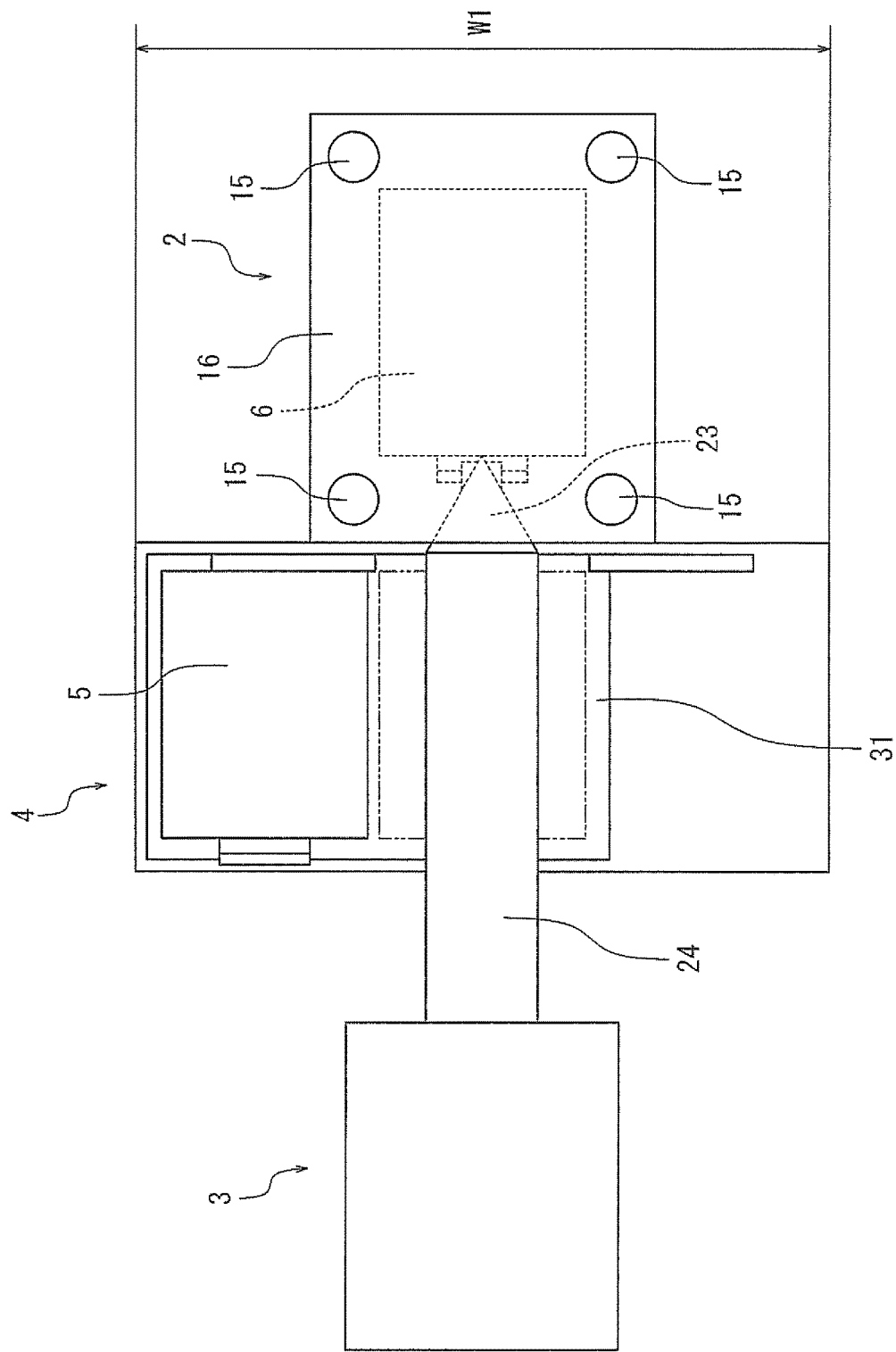
FIG. 6 is a schematic plan view of the injection molding machine shown in FIG. 1.
Figure 7:
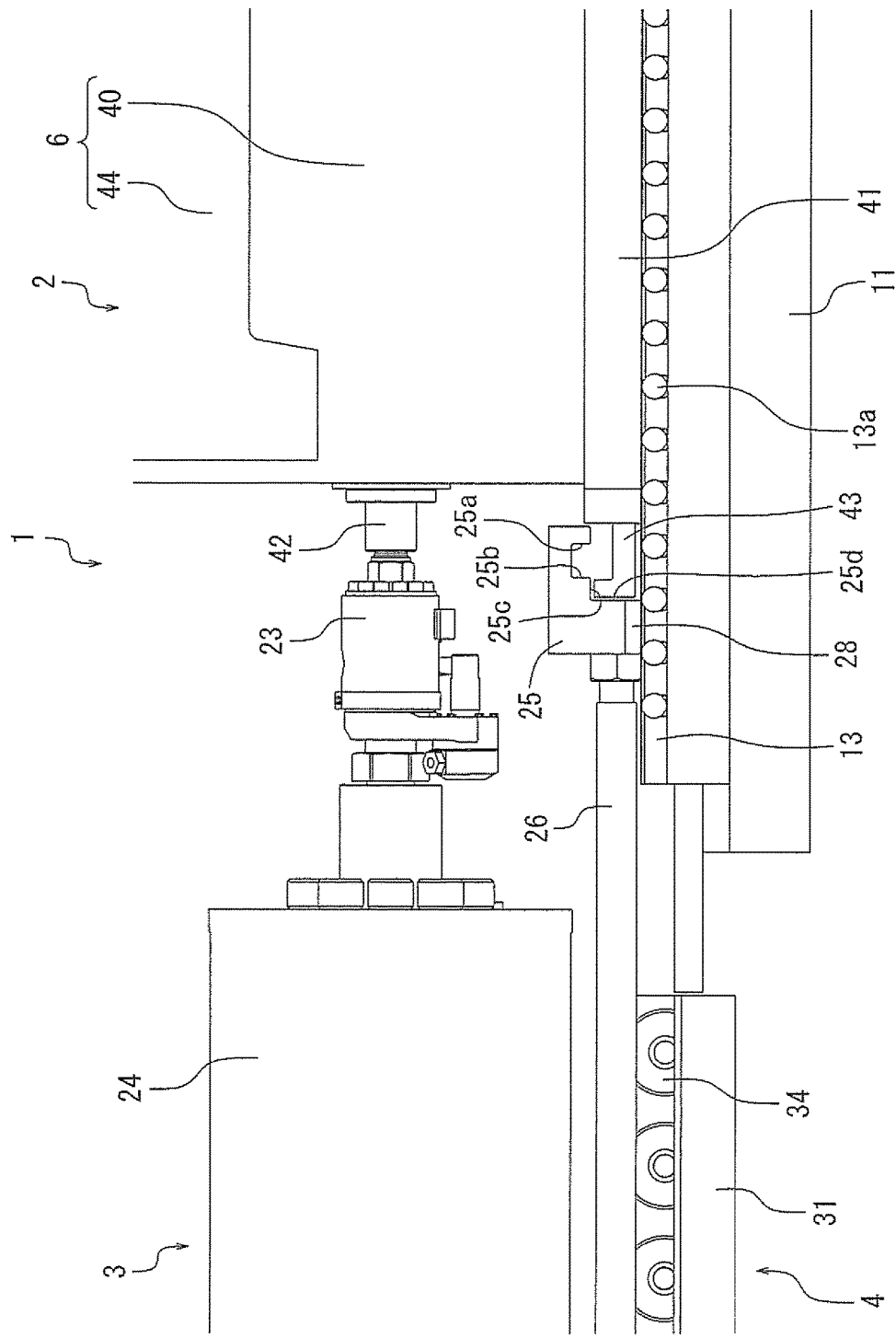
FIG. 7 is an enlarged side view of the injection molding machine shown in FIG. 1, which view illustrates an operation of the injection molding machine.
Figure 20:
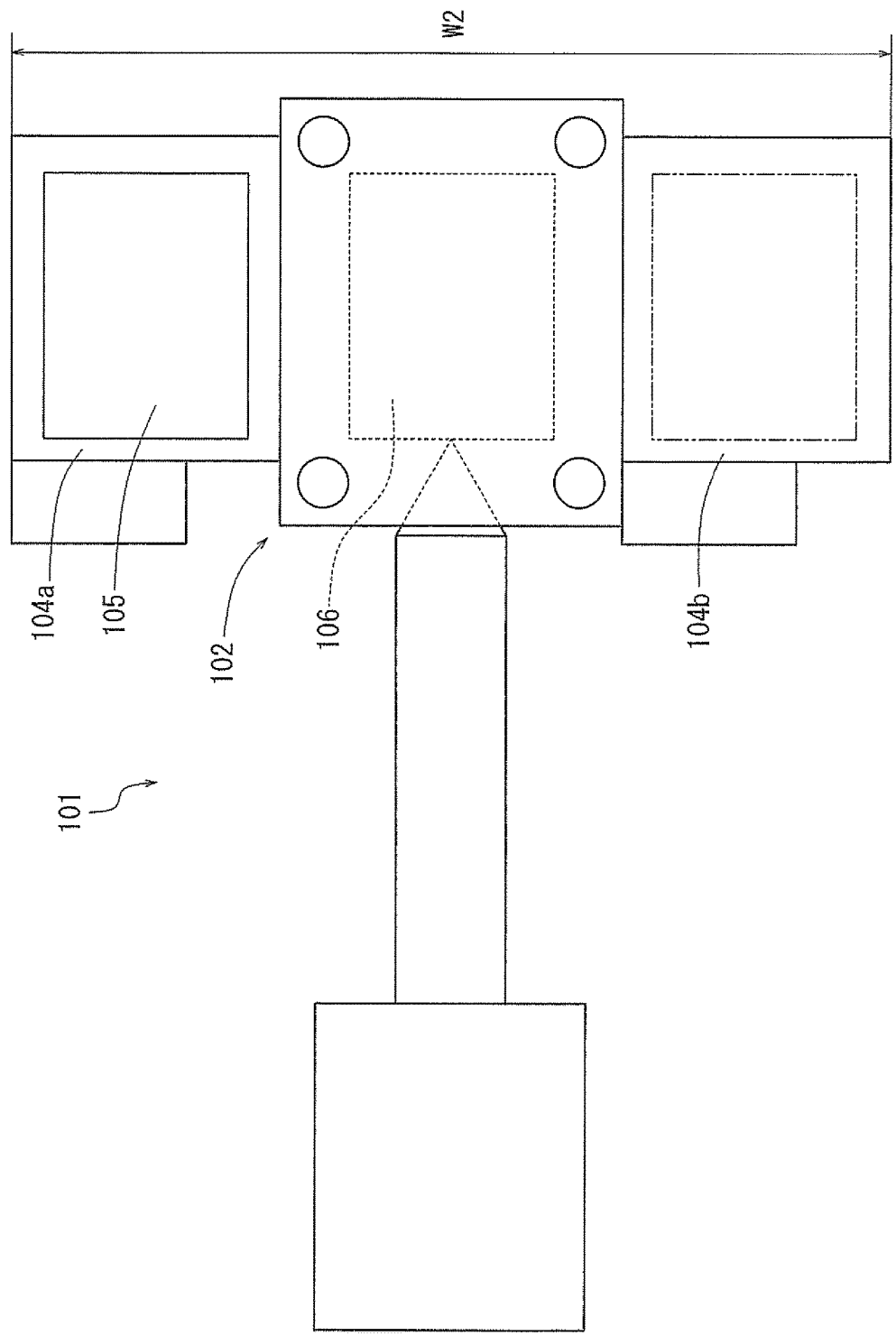
FIG. 20 is a simplified plan view of a conventional injection molding machine.

As previously described, unlike the conventional injection molding machine, in embodiments disclosed herein (e.g., molding machine 1), the single die replacement unit 4 is positioned between the die clamping unit 2 and the injection unit 3 in a longitudinal direction of the injection molding machine 1. Therefore, a maximum width W1 of the injection molding machine 1 is defined by and is substantially the same as a width of the die replacement unit 4 (FIG. 6). As a result, the injection molding machine 1 has a reduced maximum width in comparison with the conventional injection molding machine having an increased maximum width W2 (FIG. 20).

As previously described, the first molding die 5 (the second molding die 6) may have the lower die half 40 and the upper die half 44 that may be vertically aligned. As shown in FIG. 1, the lower die half 40 has a flange 41 formed in a lower end periphery thereof. The flange 41 is held by the two pairs of clamps 14 formed in the lower die attachment plate 11, so that the lower die half 40 is secured to the lower die attachment plate 11. Further, the lower die half 40 includes a nozzle engagement portion 42 in fluid communication with the molding recess of the lower half die 40. The nozzle engagement portion 42 is positioned so as to engage the nozzle 23 formed in the heating cylinder 24 of the injection unit 3 when the slider 21 of the injection unit 3 is moved toward the die clamping unit 2. Upon engagement of the nozzle engagement portion 42 and the nozzle 23, the molten resin may be fed to the nozzle engagement portion 42 via the nozzle 23, so as to be injected into the molding cavity of the first molding die 5 (or the second molding die 6).

Further, as shown in FIG. 5, the lower die half 40 has a hook engagement portion 43. The hook engagement portion 43 is positioned such that the hook 25 of the engagement rod 26 attached to the slider 21 of the injection unit 3 is hooked thereon when the slider 21 is moved toward the die clamping unit 2.

As shown in FIGS. 3 and 4, the upper die half 44 has a flange 45 formed in an upper periphery thereof. The flange 45 is held by the two pairs of clamps 17 formed in the upper die attachment plate 16, so that the upper die half 44 is secured to the upper die attachment plate 16.

A die replacing operation of the injection molding machine 1 thus constructed will now be described with reference to FIGS. 7 to 19.

In order to replace the second molding die 6 with the first molding die 5 after a molding operation using the second molding die 6 is completed in the die clamping unit 2, the clamps 14 of the lower die attachment plate 11 and the clamps 17 of the upper die attachment plate 16 are disengaged from the flange 41 of the lower die half 40 and the flange 45 of the upper die half 44, respectively, in a condition in which the second molding die 6 is closed, so that the lower die half 40 and the upper die half 44 can be released from the lower die attachment plate 11 and the upper die attachment plate 16 (FIG. 7), respectively. The upper die attachment plate 16 is then moved upward, so as to be spaced from the lower die attachment plate 11. As a result, the second molding die 6 (a combination of the lower die half 40 and the upper die half 44) is positioned on the lower die attachment plate 11. At this time, the hook 25 of the engagement rod 26 attached to the slider 21 of the injection unit 3 is unhooked from the hook engagement portion 43 of the lower die half 40.

At this time, in the die replacement unit 4, the table 31 is held in the left-side position on the base 30 such that the (empty) right die receiving portion 31b of the table 31 is longitudinally aligned with the second molding die 6 positioned on the lower die attachment plate 11 of the die clamping unit 2 while the heating cylinder 24 of the injection unit 3 is positioned thereover (FIG. 1). That is, the right die receiving portion 31b of the table 31 is positioned in a die replacement position of the die replacement unit 4. Further, the first molding die 5 is positioned on the left die receiving portion 31a of the table 31 (FIGS. 1 and 2).

Figure 8:
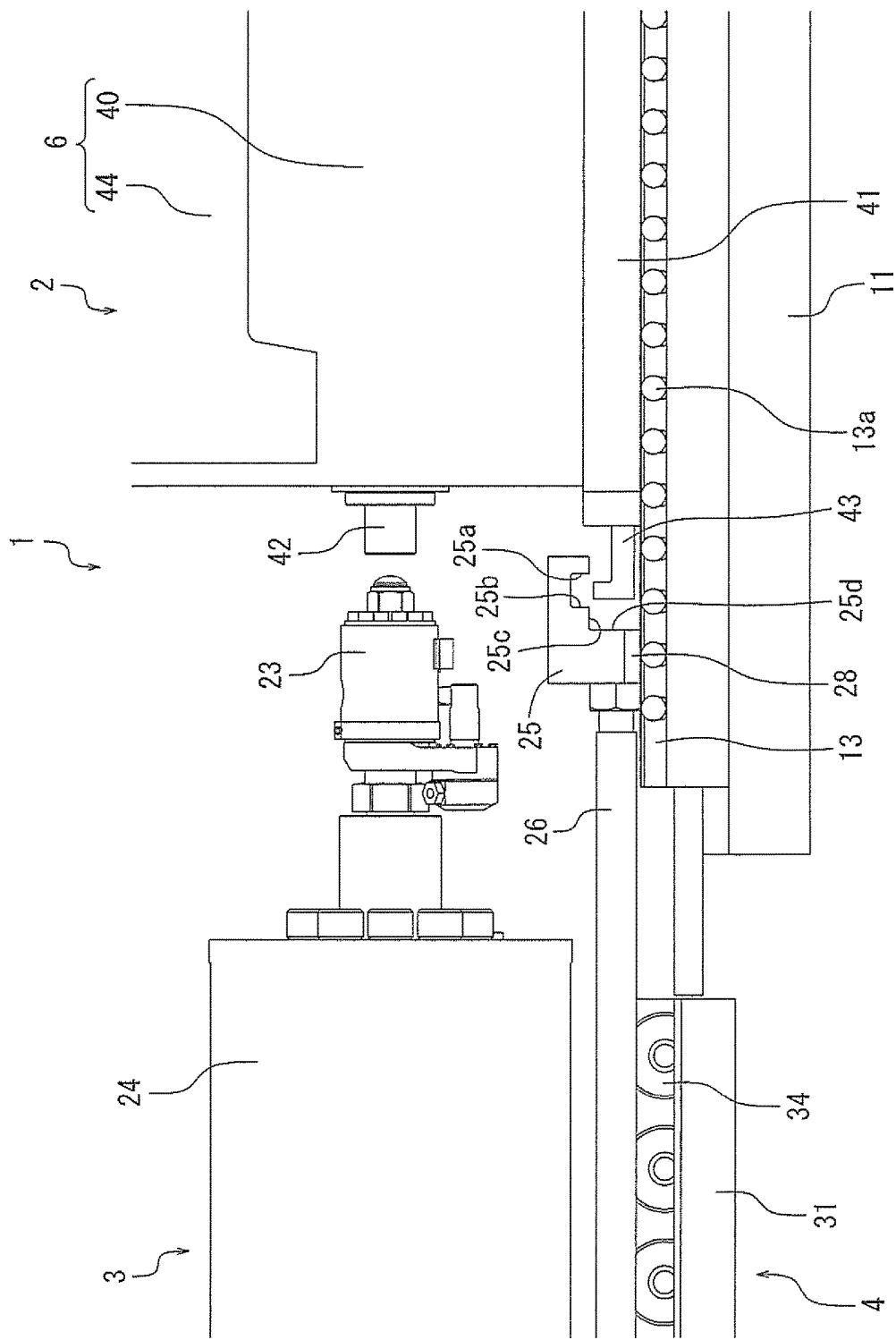
FIG. 8 is an enlarged side view of the injection molding machine shown in FIG. 1, which view illustrates the operation of the injection molding machine.

Subsequently, in the injection unit 3, the slider 21 are reversely moved by the drive source 22 such that the heating cylinder 24 is slightly moved backward (away from the second molding die 6 received in the die clamping unit 2). As a result, as shown in FIG. 8, the nozzle 23 formed in the heating cylinder 24 is disengaged from the nozzle engagement portion 42 of the lower die half 40.

Figure 9:
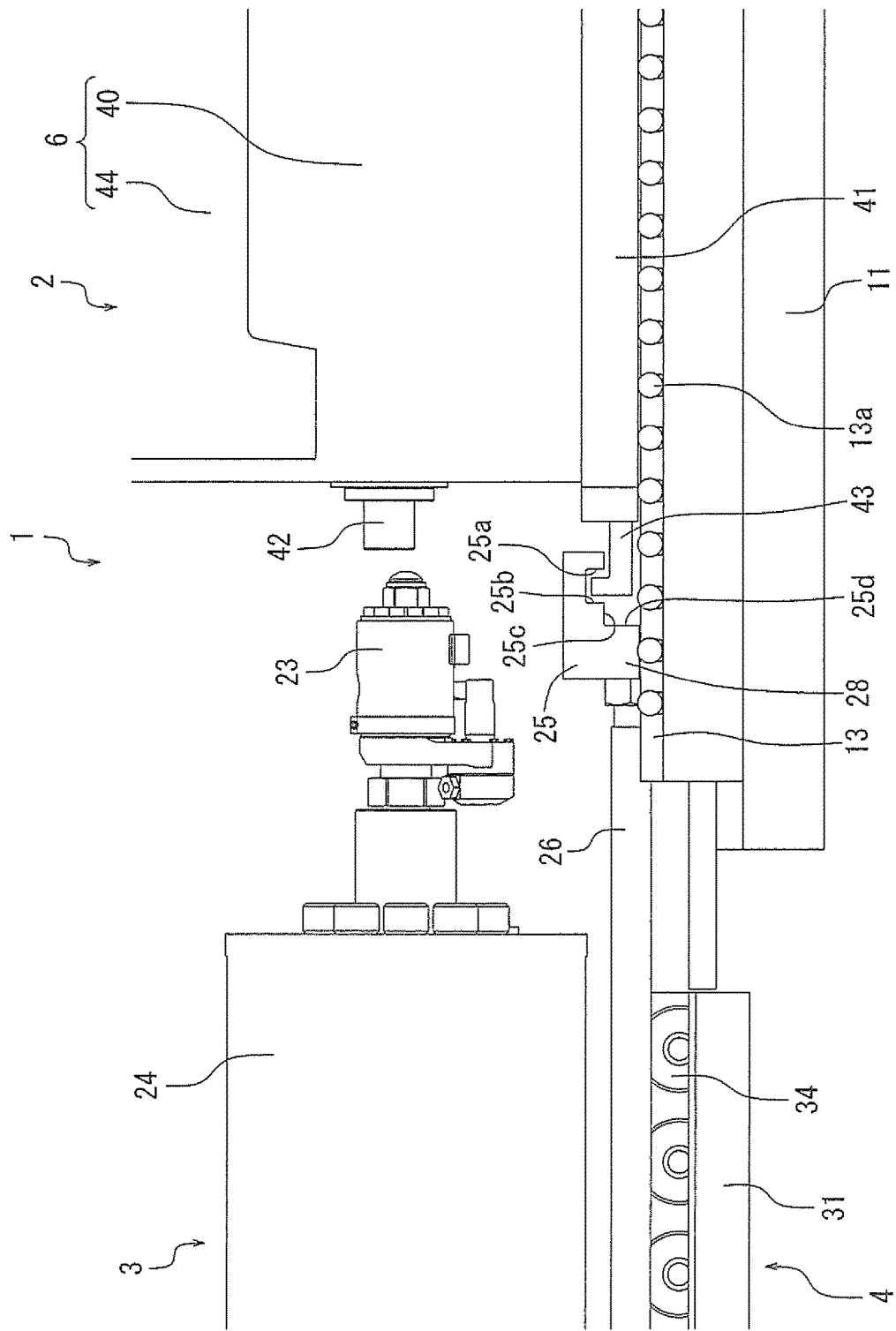
FIG. 9 is an enlarged side view of the injection molding machine shown in FIG. 1, which view illustrates the operation of the injection molding machine.

Next, in the die clamping unit 2, the die lifters 13 are activated or moved upward. As a result, as shown in FIG. 9, the lower die half 40 is elevated relative to the lower die attachment plate 11. Due to elevation of the lower die half 40, the hook engagement portion 43 formed in the lower die half 40 is lifted up so that the hook 25 of the engagement rod 26 attached to the slider 21 of the injection unit 3 is hooked thereon.

Figure 10:
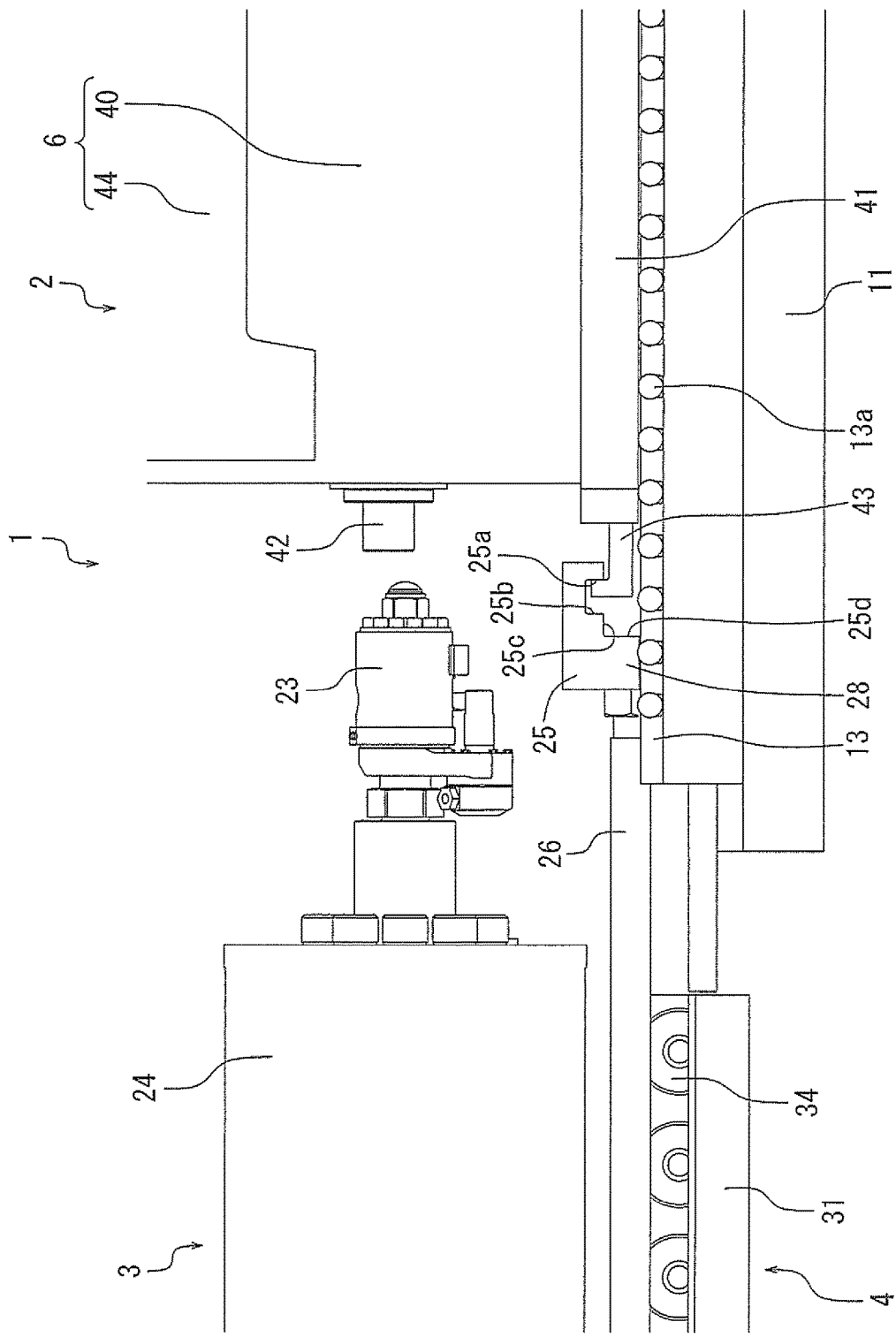
FIG. 10 is an enlarged side view of the injection molding machine shown in FIG. 1, which view illustrates the operation of the injection molding machine.
Figure 11:
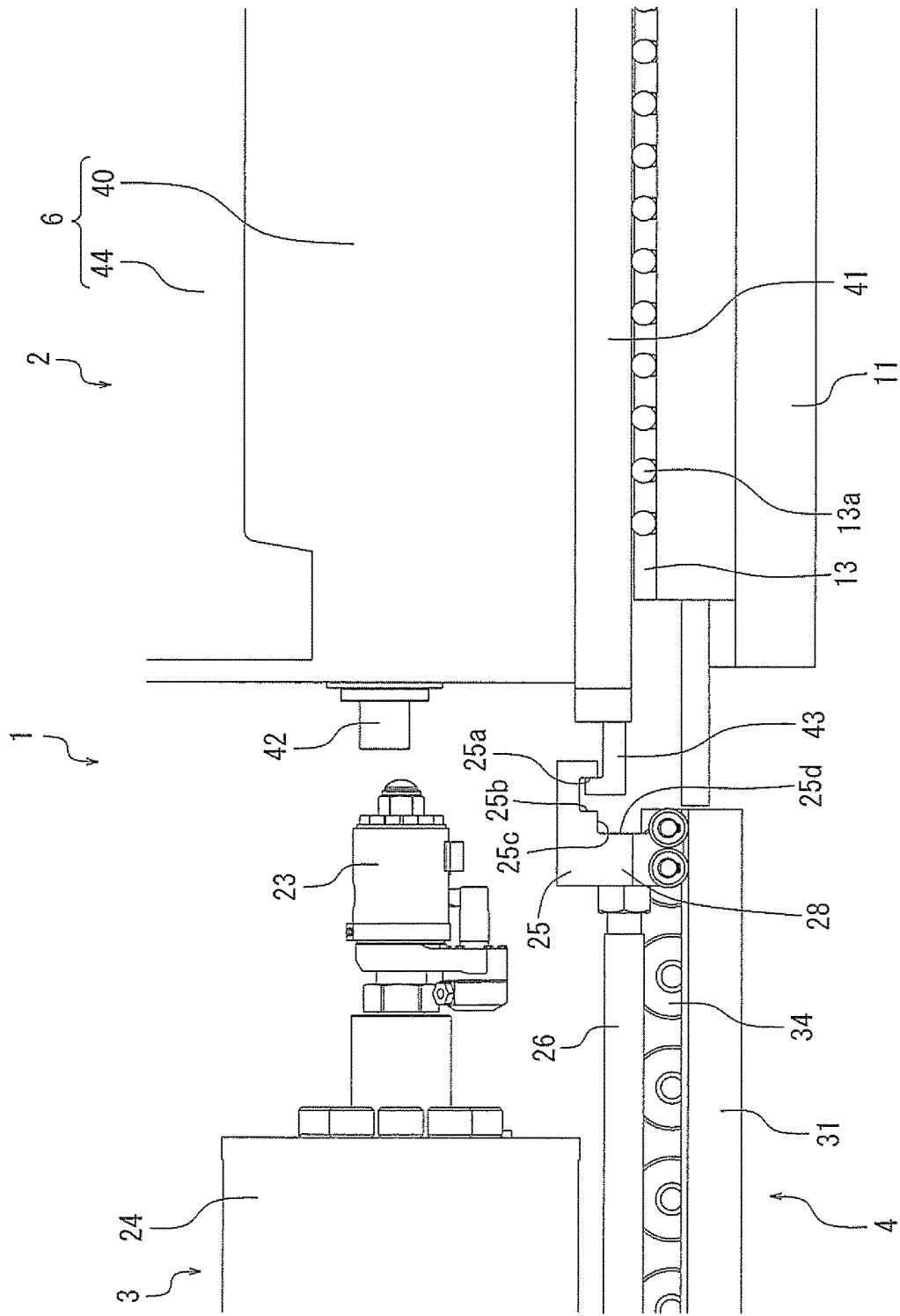
FIG. 11 is an enlarged side view of the injection molding machine shown in FIG. 1, which view illustrates the operation of the injection molding machine.
Figure 12:
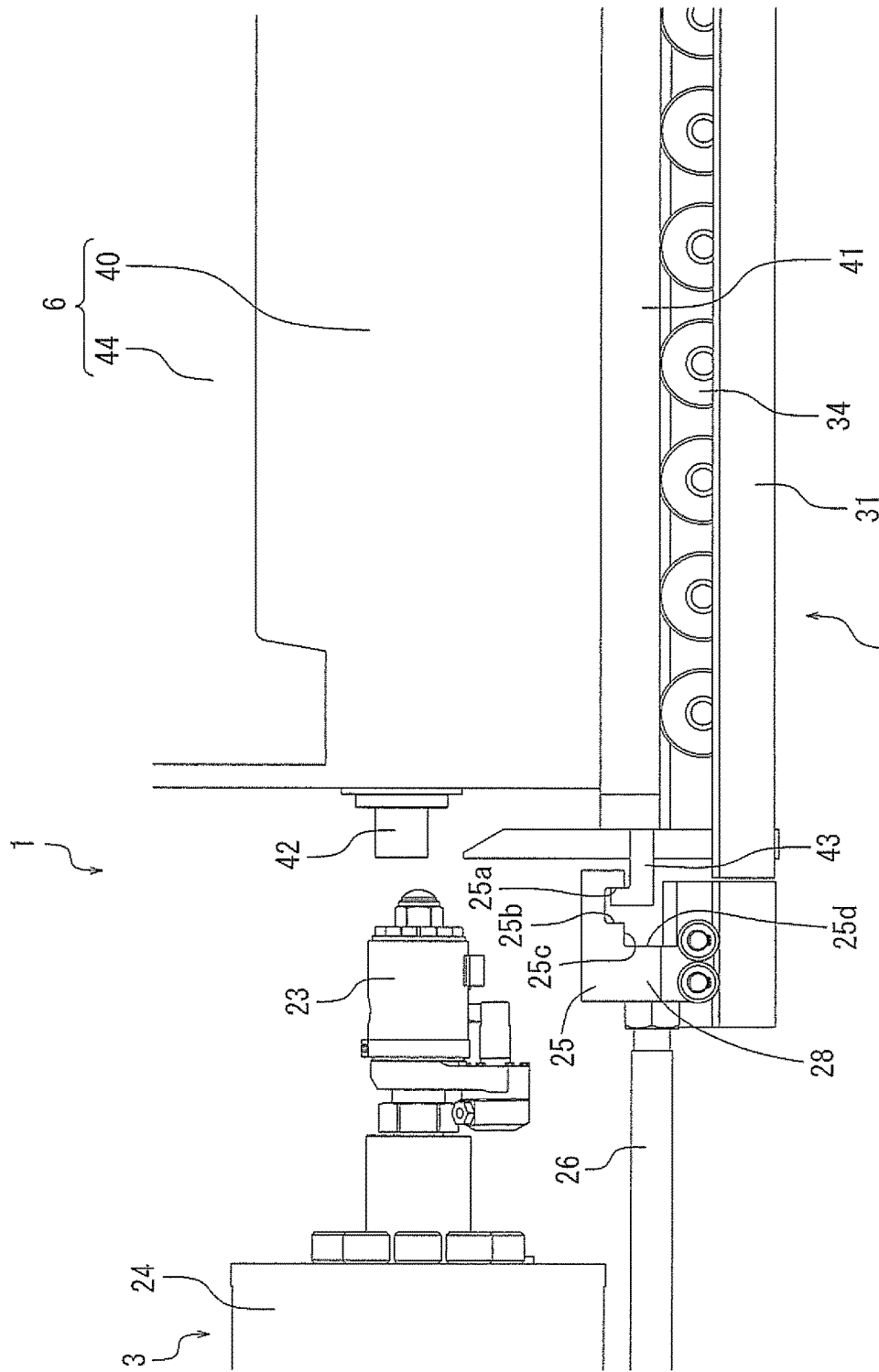
FIG. 12 is an enlarged side view of the injection molding machine shown in FIG. 1, which view illustrates the operation of the injection molding machine.

Thereafter, in the injection unit 3, the slider 21 are reversely moved by the drive source 22, so that the heating cylinder 24 is moved backward (away from the die clamping unit 2). As a result, as shown in FIG. 10, the hook 25 of the engagement rod 26 attached to the slider 21 is pulled backward, so that the pulling surface 25a formed in the hook 25 may engage or contact the hook engagement portion 43 of the lower die half 40. At this time, the hook 25 moves along the guide member 12 attached to the lower die attachment plate 11 via the guide block 28 attached to the hook 25 (FIG. 5). As shown in FIG. 11, when the heating cylinder 24 is further moved backward, the second molding die 6 (the combination of the lower die half 40 and the upper die half 44) is pulled out from the die clamping unit 2 toward the die replacement unit 4. The heating cylinder 24 can then be successively moved backward until the second molding die 6 may be completely transferred onto the right die receiving portion 31b of the table 31 of the die replacement unit 4 (FIG. 12).

Figure 13:
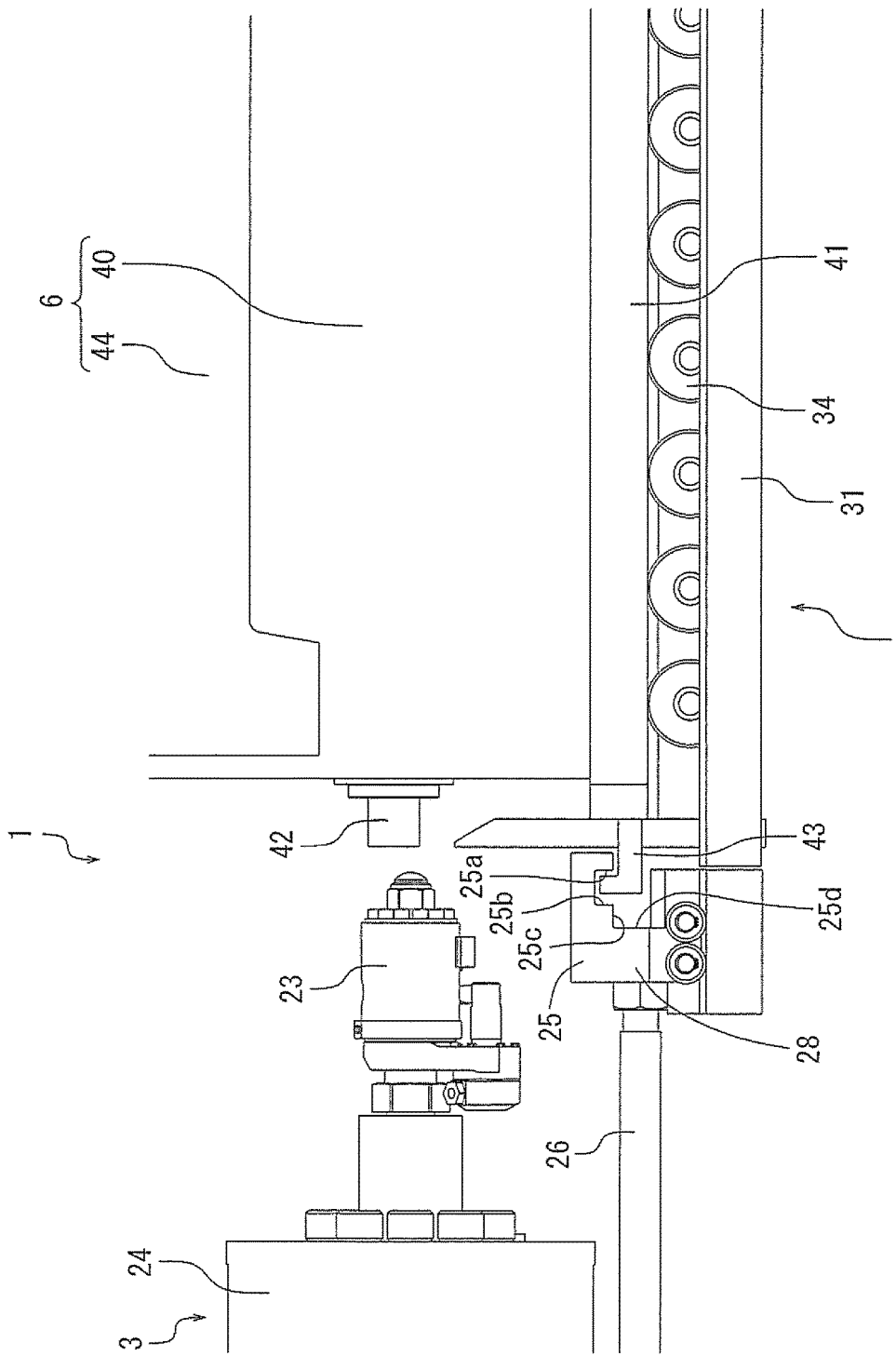
FIG. 13 is an enlarged side view of the injection molding machine shown in FIG. 1, which view illustrates the operation of the injection molding machine.

As shown in FIG. 13, when the second molding die 6 is completely transferred onto the right die receiving portion 31b of the table 31 of the die replacement unit 4, the slider 21 is moved by the drive source 22 such that the heating cylinder 24 can be slightly moved forward (toward the second molding die 6 placed in the die replacement unit 4). As a result, as shown in FIG. 13, the pulling surface 25a of the hook 25 is disengaged or slightly spaced from the hook engagement portion 43 of the lower die half 40.

Figure 14:
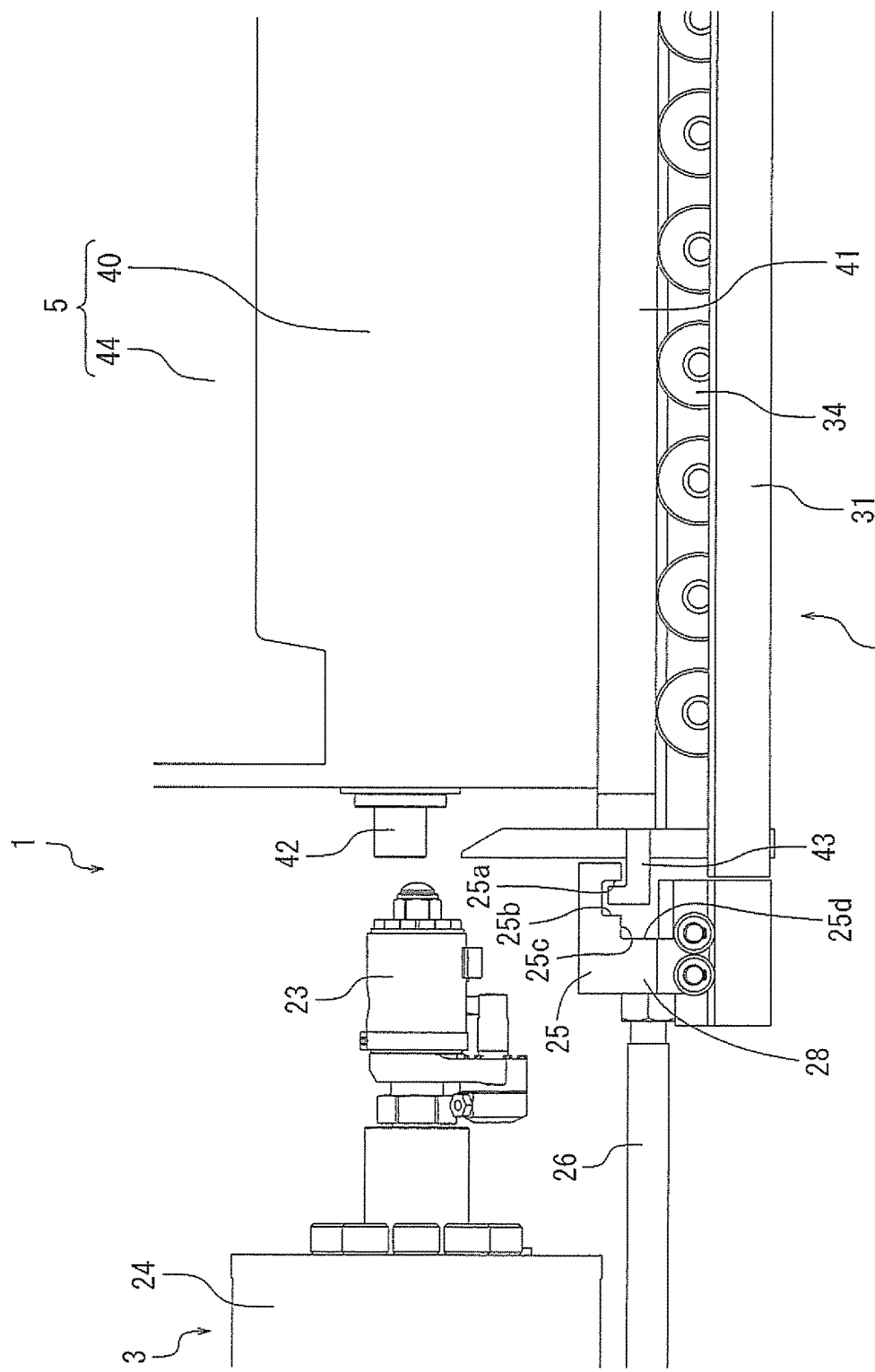
FIG. 14 is an enlarged side view of the injection molding machine shown in FIG. 1, which view illustrates the operation of the injection molding machine.

In this condition, the drive source 32 of the die replacement unit 4 is activated to slide the table 31 rightward until the table 31 is shifted to the right-side position on the base 30. As a result, the left die receiving portion 31a of the table 31 is moved or shifted to the die replacement position of the die replacement unit 4. Conversely, the right die receiving portion 31b of the table 31 is deviated laterally (rightward) from the die replacement position of the die replacement unit 4. Thus, the second molding die 6 positioned on the right die receiving portion 31b of the table 31 can be replaced with the first molding die 5 positioned on the left die receiving portion 31a of the table 31 in the die replacement position of the die replacement unit 4 (FIG. 14). Further, at this time, the hook 25 of the engagement rod 26 attached to the slider 21 of the injection unit 3 is hooked on the hook engagement portion 43 of the first molding die 5 (FIG. 14).

Figure 15:
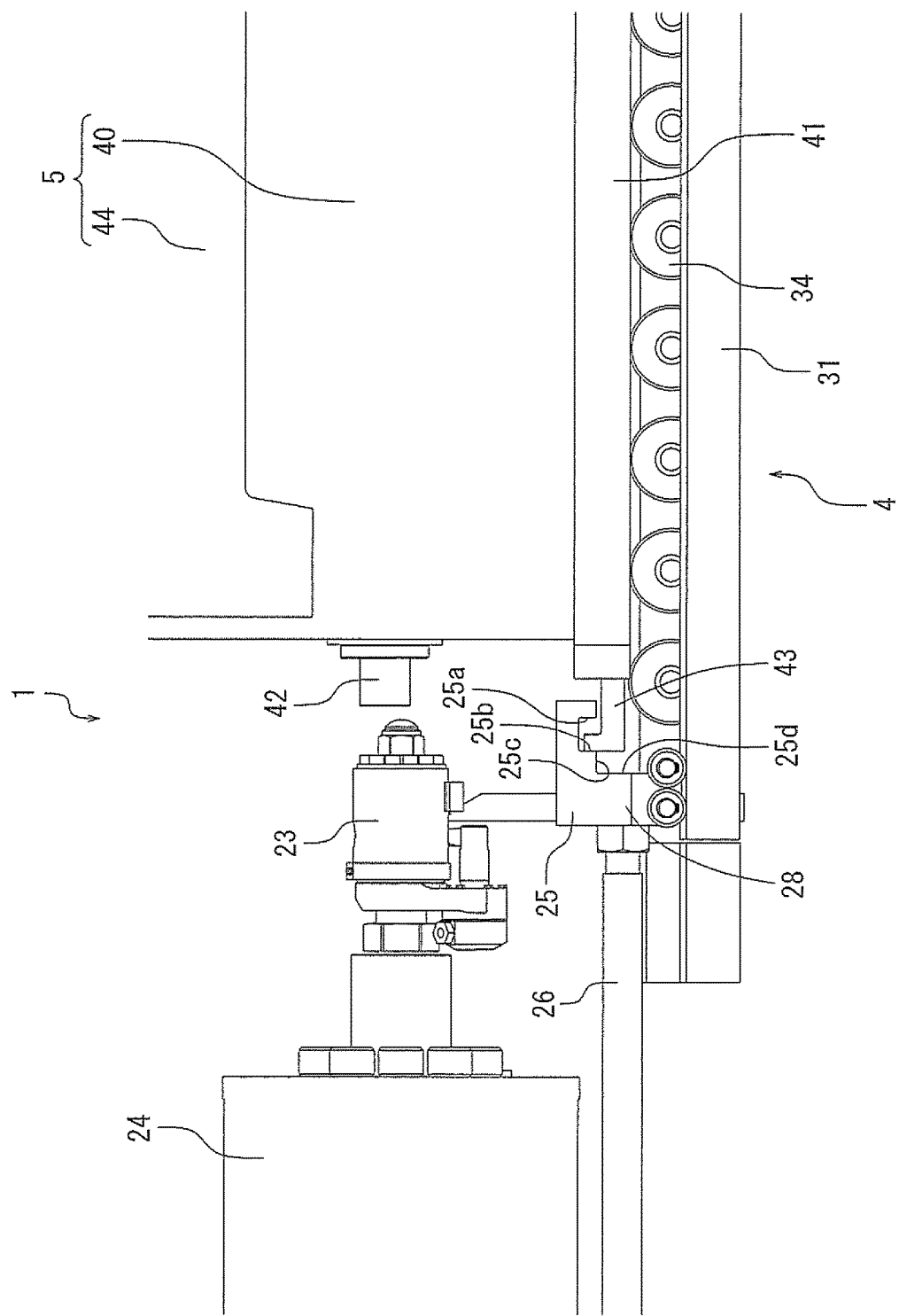
FIG. 15 is an enlarged side view of the injection molding machine shown in FIG. 1, which view illustrates the operation of the injection molding machine.
Figure 16:
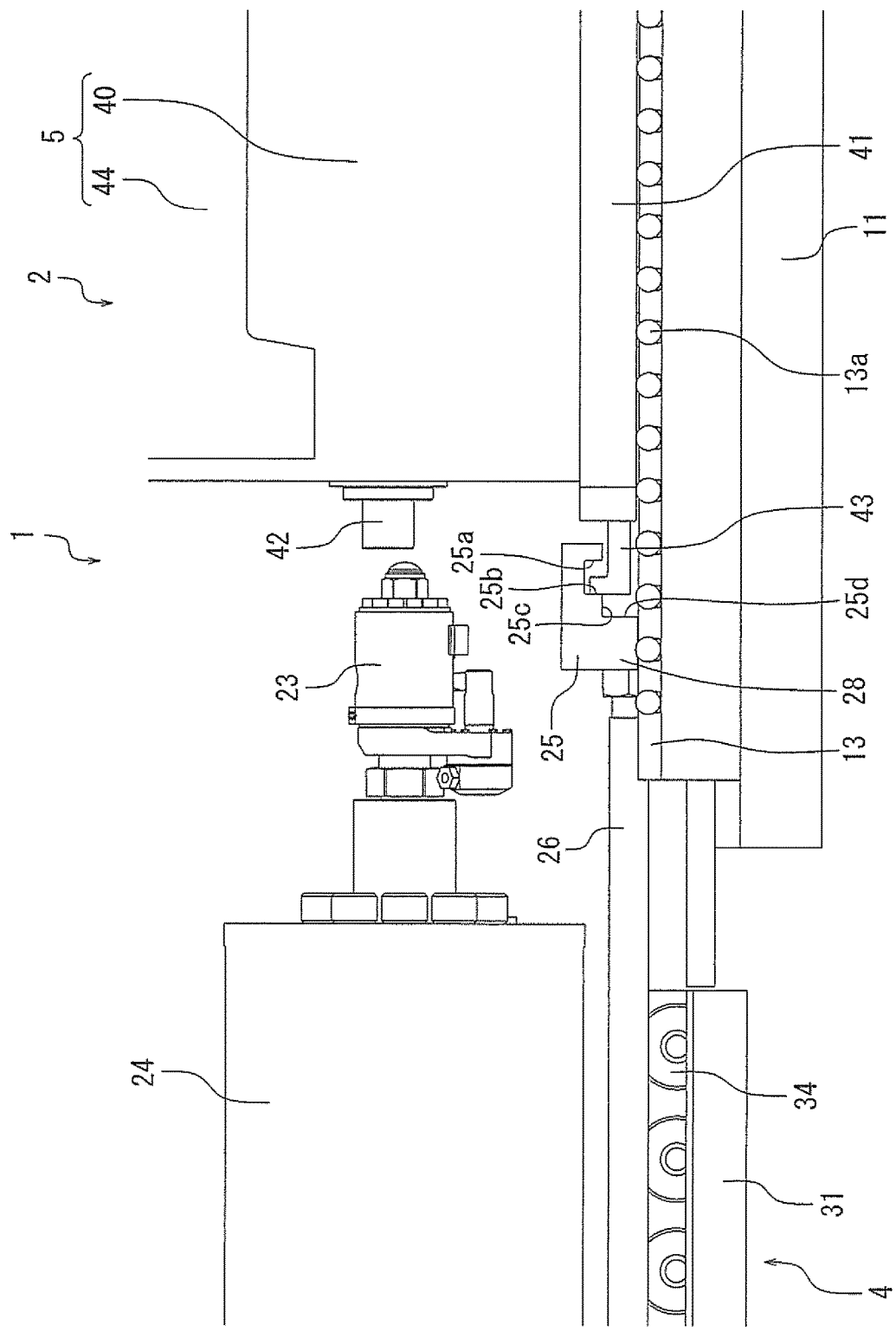
FIG. 16 is an enlarged side view of the injection molding machine shown in FIG. 1, which view illustrates the operation of the injection molding machine.

Thereafter, in the injection unit 3, the slider 21 is moved by the drive source 22, so that the heating cylinder 24 is moved forward (toward the die replacement unit 4). As a result, as shown in FIG. 15, the pushing surface 25b formed in the hook 25 of the engagement rod 26 attached to the slider 21 engages or contacts the hook engagement portion 43 of the lower die half 40 of the first molding die 5. Therefore, when the heating cylinder 24 is further moved forward, the first molding die 5 (the combination of the lower die half 40 and the upper die half 44) is pushed into the die clamping unit 2, so as to be transferred onto the lower die attachment plate 11 via the lifters 13. The heating cylinder 24 can then be successively moved forward until the first molding die 5 completely transferred onto the lower die attachment plate 11 (FIG. 16). Thus, a die transferring operation of the first molding die 5 into the die clamping unit 2 is completed.

Figure 17:
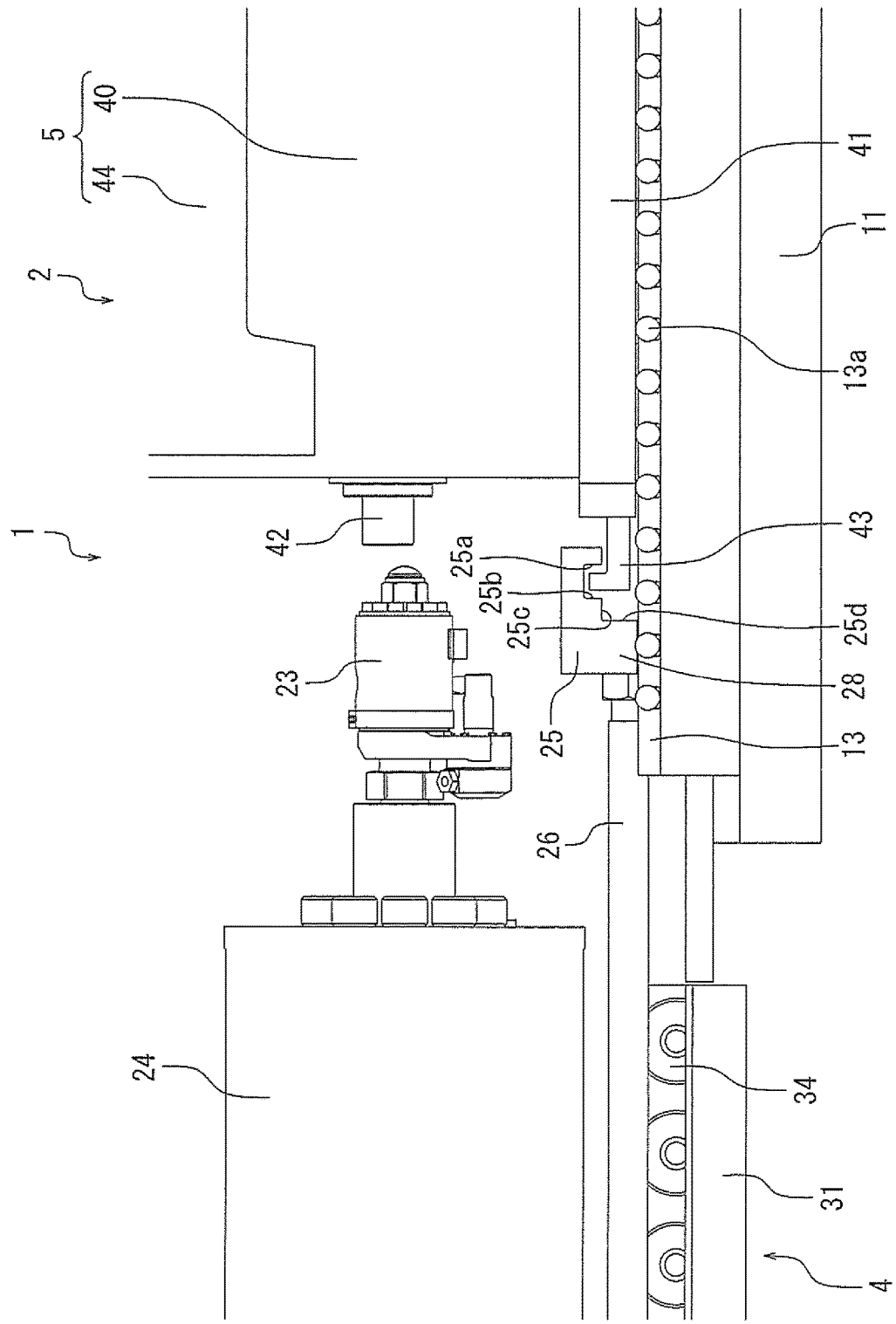
FIG. 17 is an enlarged side view of the injection molding machine shown in FIG. 1, which view illustrates the operation of the injection molding machine.

After the die transferring operation is completed, the slider 21 of the injection unit 3 is moved by the drive source 22 such that the heating cylinder 24 is slightly moved backward. As a result, as shown in FIG. 17, the pushing surface 25b of the hook 25 is disengaged or spaced from the hook engagement portion 43 of the lower die half 40 of the first molding die 5.

Figure 18:
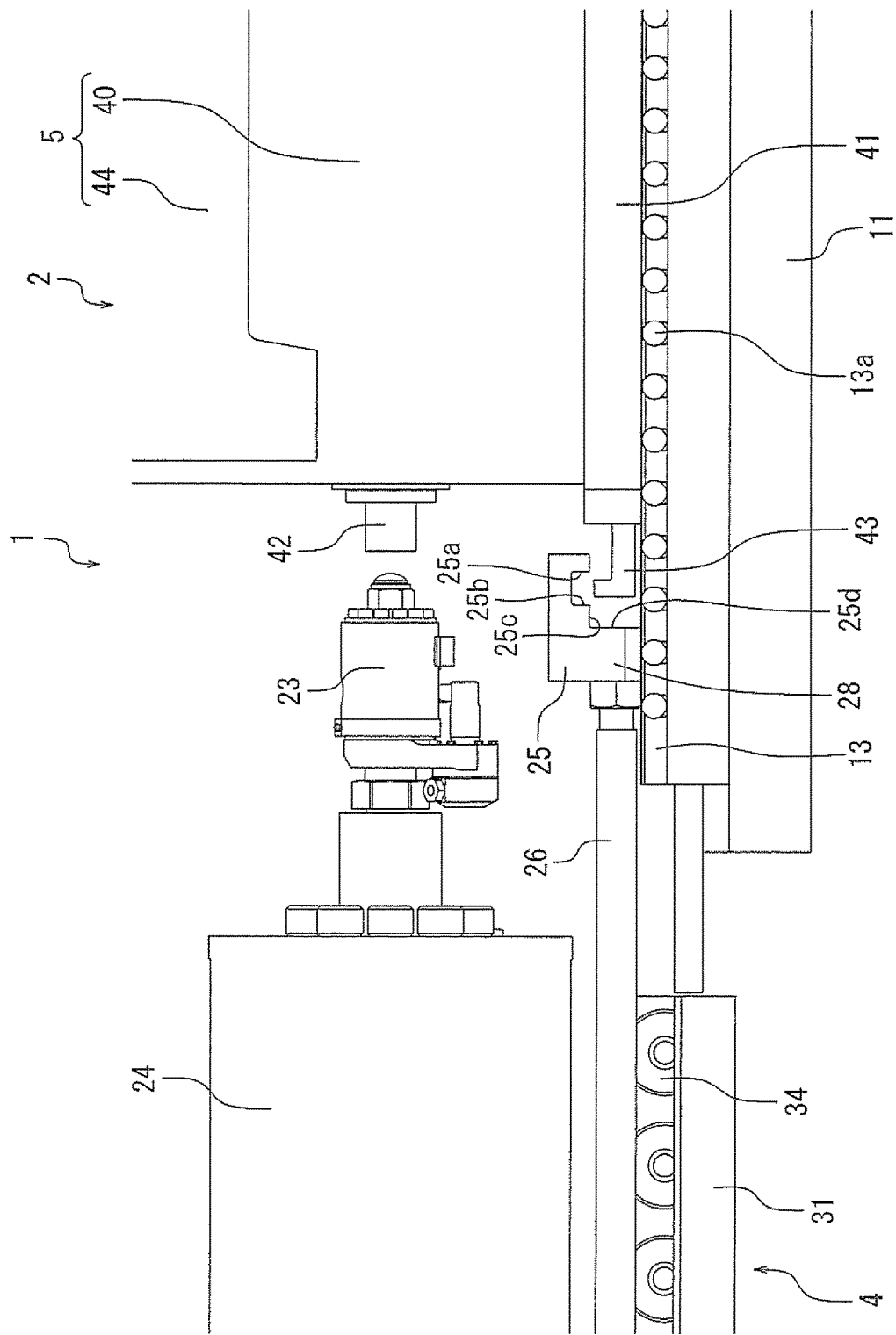
FIG. 18 is an enlarged side view of the injection molding machine shown in FIG. 1, which view illustrates the operation of the injection molding machine.

Thereafter, in the die clamping unit 2, the die lifters 13 are deactivated or moved downward. As a result, as shown in FIG. 18, the first molding die 5 is lowered so as to be directly placed on the lower die attachment plate 11. Due to lowering of the first molding die 5, the hook engagement portion 43 formed in the lower die half 40 is lowered, so that the hook 25 of the engagement rod 26 attached to the slider 21 of the injection unit 3 is released or unhooked from the hook engagement portion 43.

Figure 19:
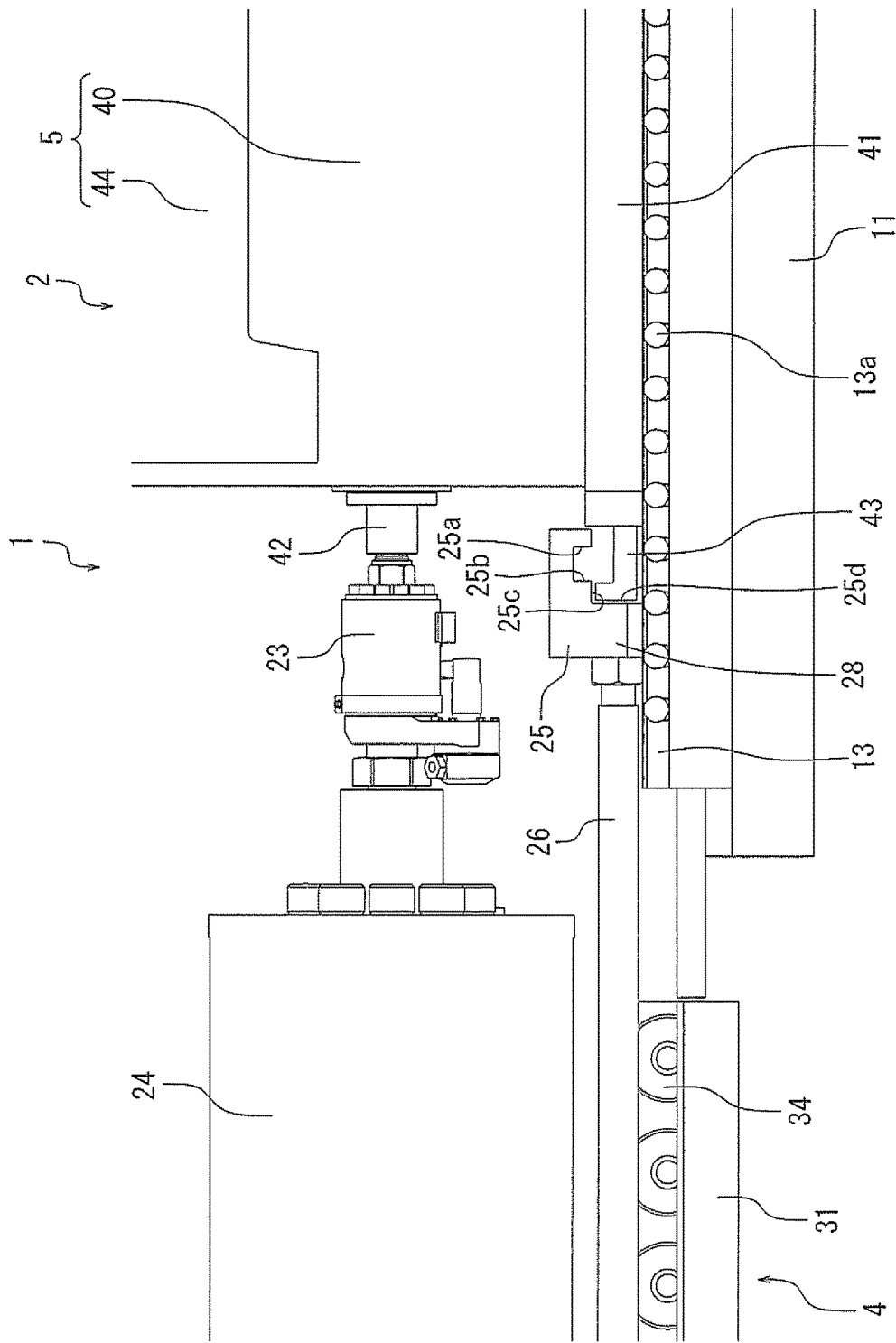
FIG. 19 is an enlarged side view of the injection molding machine shown in FIG. 1, which view illustrates the operation of the injection molding machine.

Finally, in the injection unit 3, the slider 21 is moved by the drive source 22 such that the heating cylinder 24 is slightly moved forward (toward the first molding die 5 received in the die clamping unit 2). As a result, as shown in FIG. 19, the nozzle 23 formed in the heating cylinder 24 contacts or engages the nozzle engagement portion 42 of the lower die half 40 of the first molding die 5. Thus, the second molding die 6 can be replaced with the first molding die 5. That is, the die replacing operation is completed.

According to the injection molding machine 1, the drive source 22 of the injection unit 3 to move the heating cylinder 24 having the nozzle 23 can be used in order to pull out the second molding die 6 from the die clamping unit 2 or to push the first molding die 5 into the die clamping unit 2. That is, the injection molding machine 1 does not need any additional drive sources to pull out the second molding die 6 from the die clamping unit 2 or to push the first molding die 5 into the die clamping unit 2.

According to the injection molding machine 1, the die replacement unit 4 may be disposed between the die clamping unit 2 and the injection unit 3. Therefore, the injection molding machine 1 may have the maximum width W1 that is smaller than the maximum width W2 of the conventional injection molding machine (FIGS. 6 and 20).

Further, in the conventional injection molding machine 101, the first and second die replacement units 104a and 104b need two special drive sources. To the contrary, according to embodiments described herein (e.g., injection molding machine 1), the die replacement unit 4 needs only the single special drive source 32 in order to move the table 31. That is, the injection molding machine 1 may reduce the total number of drive sources.

The engagement rod 26 having the hook 25 can be attached to the slider 21. Therefore, the engagement rod 26 can reliably move or slide with the heating cylinder 24 connected to the slider 21.

The engagement rod 26 can be attached to the slider 21 via the floating joint 27. That is, the engagement rod 26 may be swingably connected to the slider 21. Therefore, the engagement rod 26 can be easily restored even if it is displaced or inclined with respect to an axis by an external force applied thereto. As a result, the engagement rod 26 can reliably push or pull the first molding die 5 and the second molding die 6.

The hook 25 can be configured to be longitudinally guided by the guide member 12 attached to the lower die attachment plate 11. In particular, the hook 25 is configured to be guided while the guide block 28 attached to the hook 25 is slid along the guide member 12. Therefore, the hook 25 can be reliably hooked on the hook engagement portion 43 of the first molding die 5 (the second molding die 6). As a result, the first molding die (the second molding die 6) can be accurately pushed into the die clamping unit 2, so as to be placed on the lower die attachment plate 11 at a predetermined position.

The hook 25 of the engagement rod 26 may have the pulling surface 25a, the pushing surface 25b positioned longitudinally opposite to the pulling surface 25a, and the relief surface 25d continuous with the pushing surface 25b via the shouldered surface 25c. Therefore, the hook 25 can reliably push and pull the first molding die 5 (the second molding die 6) by simply moving back and forth. Further, the hook 25 can be easily hooked on and unhooked from the hook engagement portion 43 formed in the first molding die 5 (the second molding die 6) by simply changing a height of the first molding die 5 (the second molding die 6).

A representative example of the present disclosure has been described in detail with reference to the attached drawings. This detailed description is merely intended to teach a person of skill in the art further details for practicing preferred aspects of the present disclosure and is not intended to limit the scope of the disclosure. Only the claims define the scope of the claimed disclosure. Therefore, combinations of features and steps disclosed in the foregoing detailed description may not be necessary to practice the disclosure in the broadest sense, and are instead taught merely to particularly describe detailed representative examples of the disclosure. Moreover, the various features taught in this specification may be combined in ways that are not specifically enumerated in order to obtain additional useful embodiments of the present disclosure.

What is claimed is:

1. An injection molding machine for injecting a molten resin into a cavity of a molding die clamped in a die clamping unit via a nozzle formed in a heating cylinder to form a resin article, the injection molding machine comprising:

a drive source configured to move the nozzle between a first position with the nozzle coupled to the molding die and a second position decoupled from the molding die;

wherein the drive source is configured to pull the molding die from the die clamping unit and push the molding die into the die clamping unit.

2. The injection molding machine of claim 1, wherein the heating cylinder is coupled to a slider slidably mounted to a base, wherein the slider includes an engagement member configured to engage the molding die, and wherein the engagement member is configured to be moved by the slider to pull the molding die from the die clamping unit and push the molding die into the die clamping unit.

3. The injection molding machine of claim 2, wherein the engagement member is coupled to the slider with a floating joint.

4. The injection molding machine of claim 2, wherein the engagement member is configured to be guided toward the molding die at a distal end thereof.

5. The injection molding machine of claim 2, wherein the engagement member has a hook attached to a distal end thereof and configured to be hooked on a hook engagement portion of the molding die, and wherein the hook has an inner pulling surface configured to engage the hook engagement portion so as to pull out the molding die from the die clamping unit, an inner pushing surface configured to engage the hook engagement portion so as to push the molding die into the die clamping unit, and an inner release surface configured to be free from the hook engagement portion.

6. The injection molding machine of claim 1, further comprising a die replacement unit configured to laterally slide the molding die pulled out from the die clamping unit.

7. An injection molding machine, comprising:

a die clamping unit configured to receive a molding die;

an injection unit configured to inject a molten resin to the molding die received in the die clamping unit; and a die replacement unit;

wherein the die clamping unit, the injection unit, and the die replacement unit are arranged longitudinally in line with the die replacement unit positioned between the die clamping unit and the injection unit;

wherein the die replacement unit has a first die receiving portion and a second die receiving portion configured to slide laterally, wherein the injection unit has a slider configured to move toward and away from the die clamping unit; and wherein the slider is configured to releasably engage the molding die received in the die clamping unit.

8. The injection molding machine of claim 7, wherein the die replacement unit includes a table configured to slide laterally, and wherein the first die receiving portion and the second die receiving portion are formed in the table.

9. The injection molding machine of claim 7, wherein the slider has an engagement member configured to releasably engage the molding die.

10. The injection molding machine of claim 9, wherein the engagement member has a hook configured to be hooked on and unhooked from a hook engagement portion formed in the molding die.

* * * * *